INVENTORS
GABRIEL KOSA
EDWARD PEITRY
BY
OSTROLENK, FABER, GERB & SOFFEN
ATTORNEYS

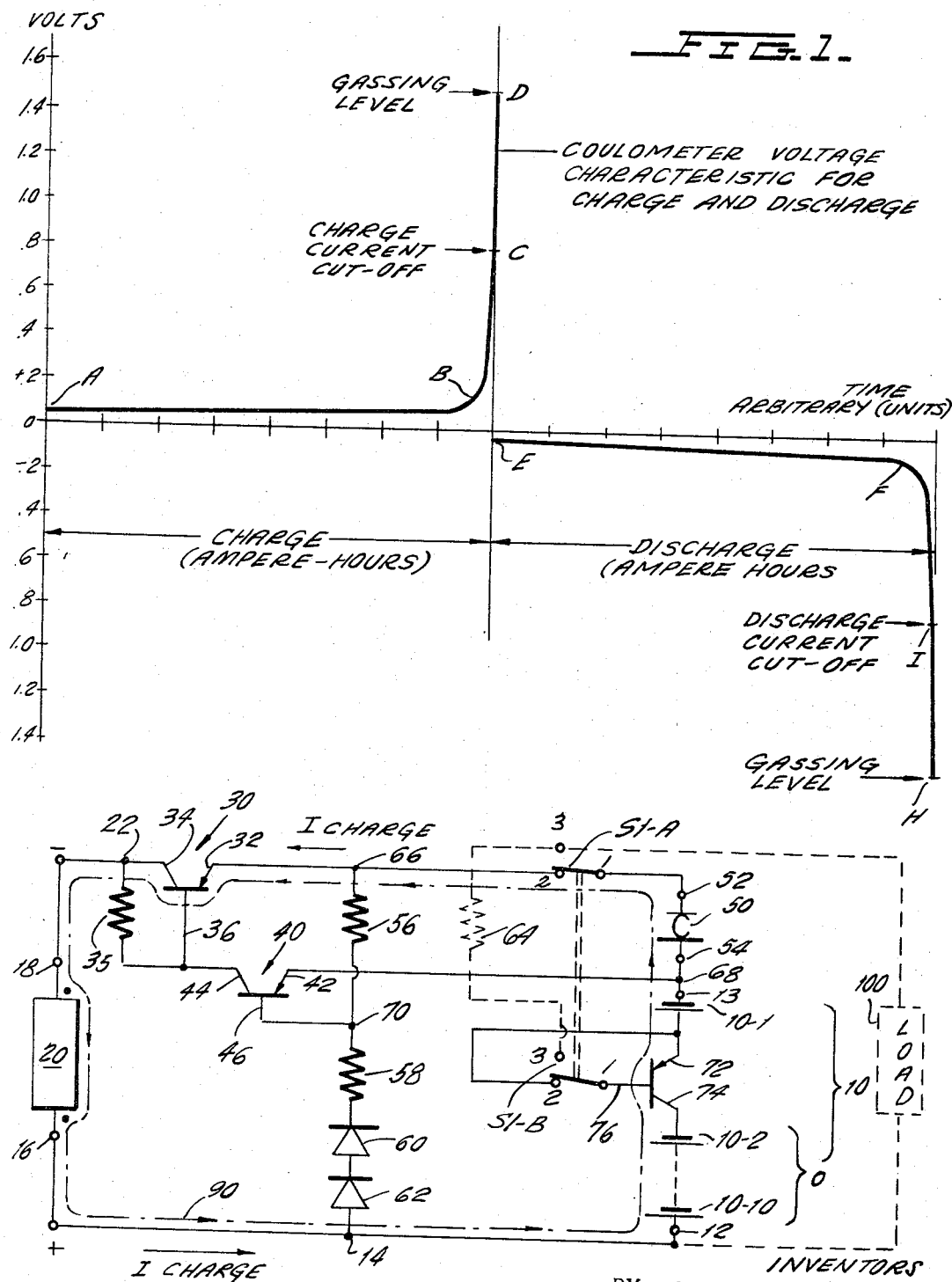

Dec. 17, 1968       G. KOSA ET AL       3,417,307
BATTERY CHARGING AND DISCHARGING CONTROL SYSTEM
Filed Feb. 14, 1966                3 Sheets-Sheet 3
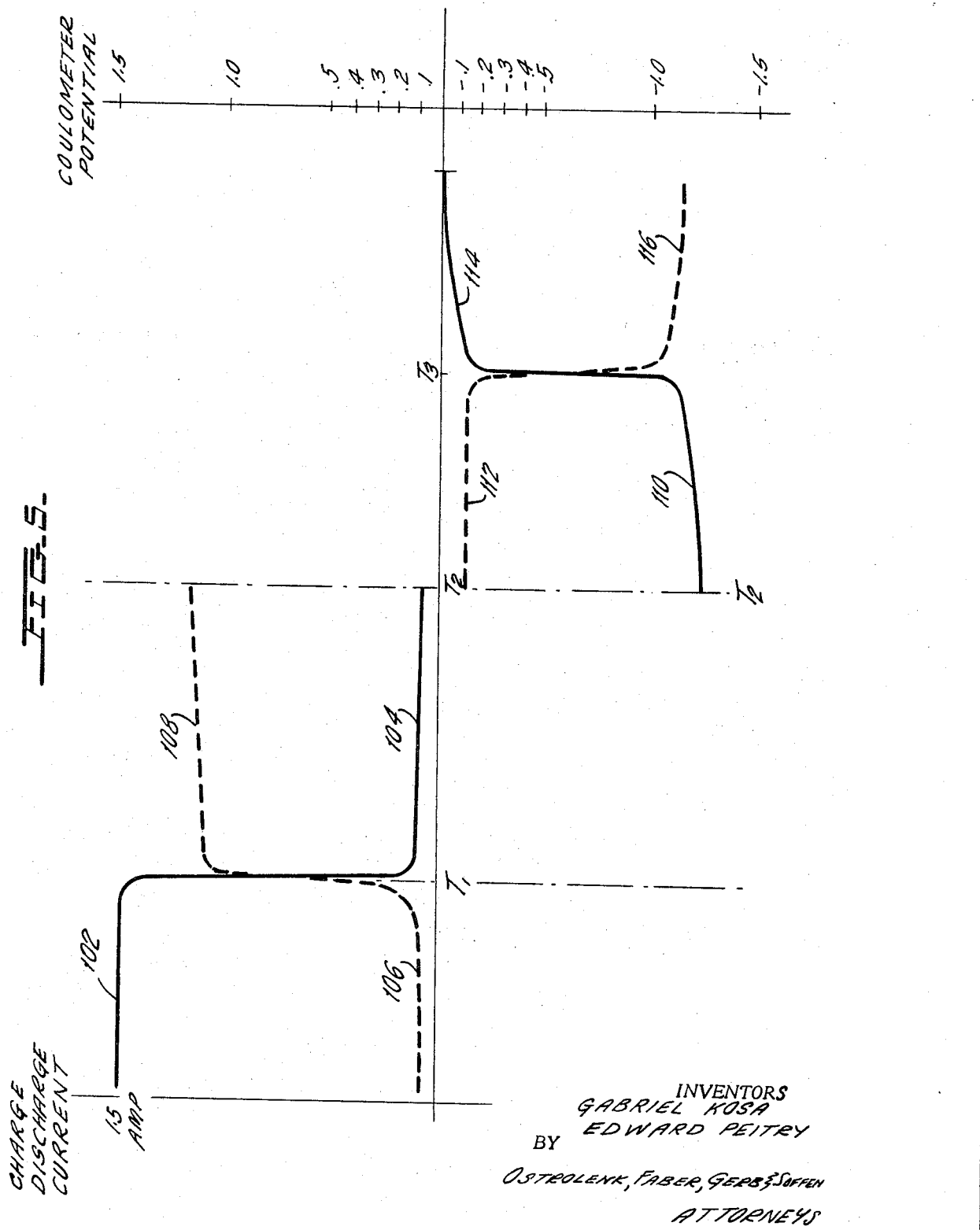

United States Patent Office 3,417,307
Patented Dec. 17, 1968

3,417,307
BATTERY CHARGING AND DISCHARGING
CONTROL SYSTEM
Gabriel Kosa, White Plains, and Edward Peitry, Harrison,
N.Y., assignors to Sonotone Corporation, Elmsford,
N.Y., a corporation of New York
Filed Feb. 14, 1966, Ser. No. 527,245
3 Claims. (Cl. 320—9)

ABSTRACT OF THE DISCLOSURE

A system for controlling either or both the rate of battery charge and discharge in accordance with the state of battery charge, as measured by a charge totalizing device (e.g., coulometer). During battery charge, the input energy for the charging source is appreciably reduced once the battery reaches a predetermined condition of charge. During battery discharge, the energy supplied by the battery is stopped when the coulometer senses that the battery has discharged to a predetermined state.

---

Our invention relates to a control system for the safe charge and discharge of a battery, and more particularly to such a system which controls either or both the rate of battery charge or dischrage, in accordance with the charge condition of the battery as determined by a charge totalizing device (e.g., coulometer).

Although it has other applications, the control circuit of our invention has shown particular utility in conjunction with sealed nickel cadmium battery cells of the general type which are summarized in copending U.S. application Ser. No. 373,216, entitled, "Third-Electrode Rechargeable Alkaline Battery Cells and Associated Battery Circuit," filed June 8, 1964, in the name of David Yehiely and assigned to the assignee of the instant invention, now abandoned.

When recharging such sealed battery cells, appropriate precautions must be taken in order to avoid overcharging which results in the excessive accumulation of gases. Otherwise the accumulation of such gases can result in a severe pressure build-up of sufficient magnitude to produce explosive rupture of the battery container. In order to avoid the danger of such overcharge, it is the conventional practice to recharge such sealed nickel cadmium cell from a constant current source at a fairly low charging rate; e.g., one-tenth the ampere hour capacity of the battery assembly. As can well be appreciated, such constant current charge circuits oftentimes require an excessive period of time to bring the depleted battery assembly back to its full charge capacity.

The term "constant current source" is a relative term, which must be construed in relationship to its associated circuitry, since such a source does, in fact, have some finite value of source impedance and generating voltage. As used herein, this term is intended to define a power source in association with a battery and charge control device, which, in the absence of any circuitry modifications (other than the impedance and voltage variations of the battery and charge control device) will maintain a substantially constant current input to the battery from a condition of charge depletion to full charge.

It has, however, been proposed that such battery assemblies may be charged from a constant current source at a fairly high initial rate, and once the battery has reached a predetermined charge condition a portion of the input charging current is bypassed to an auxiliary circuit, such that the current then flowing through the battery assembly will be of a magnitude which may be safely handled for a prolonged duration. Such a circuit disadvantageously draws substantially the full input current capacity of the charging source at all times, with the heat generated in the bypass circuit tending to cause problems of heat dissipation.

Our invention advantageously avoids these problems by first permitting a fairly rapid charging rate from the input source of electrical energy, and then when the battery has indicated a predetermined charge condition, the electrical energy input from the source will be appreciably reduced so as to then provide a battery charging current of a safe magnitude which may be utilized to provide the topping charge.

As another feature of our invention, it is quite desirable that in discharging the battery assembly to an external load that the battery not be depleted to such a low capacity condition that it tends to go into a reverse polarity condition. As discussed in copending U.S. application Ser. No. 404,763, filed Oct. 19, 1964 in the names of R. J. McCarthy and I. J. Sobel and entitled, "Rechargeable Battery Assembly with Reverse Polarity Charge Protection," now U.S. Patent No. 3,321,690 issued May 23, 1967, the repetitive cyclic operation of such battery assemblies into reverse polarity condition tends to build up hydrogen gas within the sealed unit. The evolution of such hydrogen gas by driving the cell units into a reverse polarity condition is a dangerous situation which should be avoided. Our invention so avoids this by including an over-discharge protection means within the discharge circuit which will be responsive to a signal from the charge totalizing means, indicating that the battery assembly had discharged to a predetermined level. Upon the receipt of this signal, electronic circuit means are provided for substantially stopping the discharge. Advantageously, the overdischarge protection means may also receive a signal responsive to one or more of the individual cells within the battery assembly having reached a very low voltage condition.

In accordance with an illustrated form of our invention, the charge totalizing means may be an electro-chemical coulometer cell of a known type, such as described in U.S. Patent application Ser. No. 373,217, filed June 8, 1964 in the name of David Yehiely entitled "Sealed Electro-Chemical Coulometer Cells" and assigned to the assignee of the instant invention, now abandoned. The coulometer is circuit connected in both the charging and discharge paths of the battery. The coulometer will receive a electrical charge input from the source quantitatively related to the electrical charge input delivered by the source to the battery, and will receive a charge input in the opposite direction quantitatively related to the amount of electrical charge delivered by the battery assembly to an external load. The coulometer is characterized as providing an electrical signal output, such as an abrupt change of potential, when the charge input presented thereto in either direction reaches a predetermined quantity in accordance with the coulometer construction. The characteristic of the coulometer is selected in conjunction with that of the batteries cell assembly, such that this electrical output signal may correspond to substantially the entire battery capacity, or for increased protection to only a predetermined portion of the battery capacity.

The battery charging circuit includes electronic circuit means which respond to the electrical signal output of the coulometer for reducing the rate of input charge from the source. Hence, the battery will receive an initial charge from the input source of energy at a first rate and upon the occurrence of the coulometer output signal will thereafter receive a charge at an appreciably reduced second rate.

The discharge current path of the battery includes an overprotection means similarly responsive to the electrical output signal of the coulometer device, which will be of opposite polarity. Upon the receipt of such signal, the further discharge of the battery through the load is substantially stopped.

In accordance with the particular form of our invention shown to illustrate the inventive concepts thereof, the switching within the charge and discharge current paths responsive to the coulometer potential is obtained by appropriately biased transistor means which are switched between their substantially conducting and cut-off conditions responsive to the potential output of the coulometer device.

It is therefore seen that a principal object of our invention is to provide an improved system for the cyclic charge and discharge of a battery assembly.

A further object of our invention resides in a control circuit for charging a battery assembly from electrical energy source in which the input from the source to the control circuit and the battery assembly is controlled in accordance with the quantitative electrical input to the battery.

Another object of our invention is to provide such a control circuit in which after the battery reaches its substantially charged condition the input from the source is reduced to a current magnitude which may be safely presented to the battery assembly over a prolonged duration of time.

An additional object of our invention is to provide a control circuit for the cyclic operation of a sealed nickel cadmium battery assembly, in which means responsive to the battery charge condition are provided for substantially stopping the discharge current flow.

Still a further object of our invention is to provide such a control circuit in which the responsive means includes a charge totalizing device of the coulometer variety, which is in the charge-discharge path of the battery assembly and therefore will have its charge condition vary in accordance with the battery charge condition.

Still another object of our invention is to provide a charge-discharge control circuit for a sealed nickel cadmium battery assembly in which a coulometer device is used to control both the rate of input charge current when in the charging mode of operation and to prevent overdischarge of the battery assembly when in the discharge mode of operation.

These as well as other objects of our invention will become readily apparent upon a consideration of the following descriptions and drawings in which:

FIGURE 1 represents the characteristics of a typical coulometer device which may be utilized in conjunction with the practice of our invention;

FIGURE 2 is a circuit diagram illustrating the inventive concepts of our invention and depicting the charging path during the initial period of battery charge;

FIGURE 5 graphically represents the manner in which the charging current and discharge current may be controlled in accordance with our invention.

Figure 3:
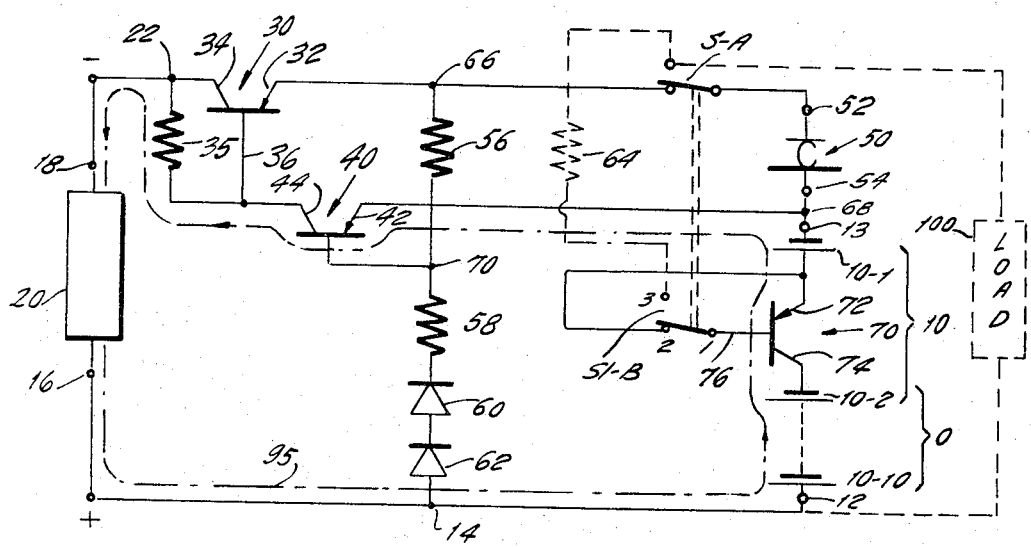
FIGURE 3 shows the circuit of FIGURE 2 with the charging current path corresponding to the battery having reached a predeterminedly selected charge capacity, as determined by the coulometer condition.
Figure 4:
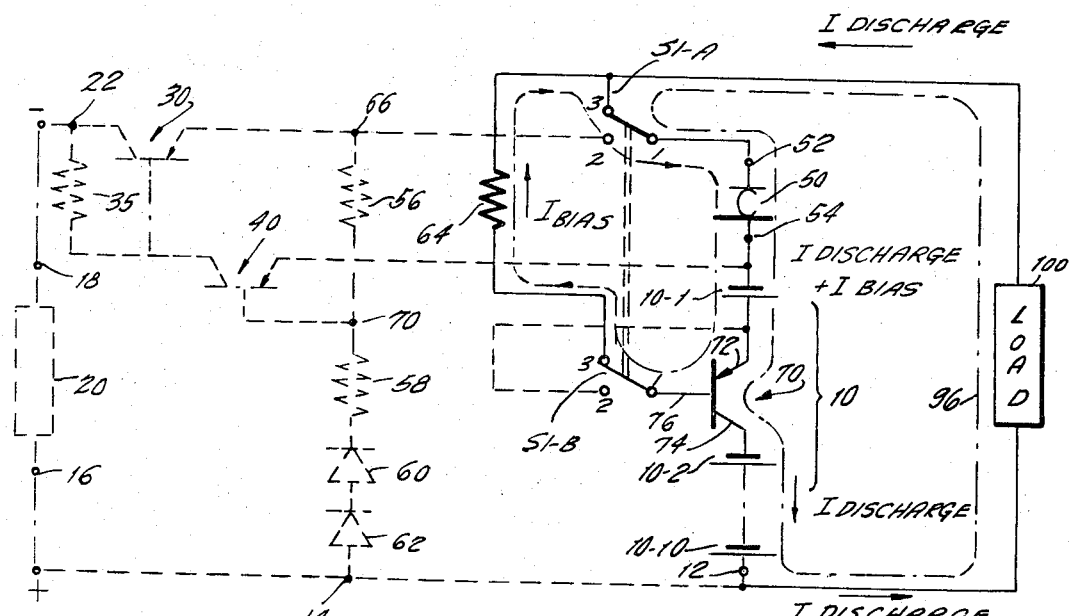
FIGURE 4 illustrates the circuit of FIGS. 2 and 3 during the battery discharge mode of operation.

To aid in understanding the manner in which the condition of the charge totalizing device or coulometer 50 shown in FIGS. 2–4 serves to effect the desired control of the charge and discharge current provided by battery assembly 10, it is believed that a brief consideration of the characteristics of such a coulometer device will be of assistance. As previously noted, the coulometer 50 may be of the electro-chemical variety which is the subject of aforementioned U.S. Patent application Ser. No. 373,217. It should, however, be understood that the designation of such a coulometer cell is for illustrative purposes only, with the broad aspects of the instant invention being likewise capable of practice in conjunction with other types of charge totalizing devices known in the art.

Such an electro-chemical coulometer cell typically includes a pair of reversible electrodes, such as cadmium (II) hydroxide $CD(OH)_2$ and of metallic cadmium—CD respectively. An external circuit passing current through the cell in one direction will convert or oxidize the cadmium of one of the electrodes into cadmium hydroxide as the cell current converts or reduces the cadmium hydroxide of the other electrode into cadmium. In such cells, as long as each of the electrodes contains both cadmium and cadmium hydroxide the voltage between the cell electrode is quite low, typically in the order of 0.05 to 0.1 volt. However, when a definite quantity of electricity has passed through the cell, required to convert or oxidize all of the cadmium of one of the electrodes nito cadmium hydroxide, and a change in the electro-chemical process occurs at one or both of the electrodes, such as the onset of gas evolution, this change is accompanied by a substantial and abrupt change of the voltage between its electrodes, rising towards a value in the order of 1.5 volts. This value may be limited to a value in the order of 0.7 volt in order to avoid excessive gas pressure build-up. Because the plates are identical, electro-chemical coulometer device 50 is reversible. As the chemical reaction proceeds in the opposite direction, the coulometer voltages displayed are negative and after the same amount of charge has passed through the coulometer in the opposite direction, the output voltage will experience a similar abrupt rise towards −1.5 volts. In accordance with our invention, the amount of charge which is required to produce the abrupt voltage response will be a predetermined quantity, operatively related to the predeterminedly selected charge input to the battery assembly 10.

The above described operation of the coulometer device 50 is graphically displayed in FIGURE 1. Point A corresponds to a substantially uncharged condition of the coulometer 50 wherein both the plates thereof contain an appreciable amount of both cadmium and cadmium hydroxide. As the charge input to the coulometer proceeds from the point A towards B, both of the coulometer plates will still contain cadmium and cadmium hydroxide and the magnitude of the output voltage is fairly low and constant in the order of a maximum of 0.1 volt. Point B corresponds to a charge input in which the balance is substantially complete and a further charge input results in an abrupt change of output voltage, rising to a value of approximately 1.5 volts at Point D, thereby providing the electrical signal output which is utilized by the system of the instant invention to control the charging current. Advantageously, a charge current cut-off is provided at Point C in order to avoid excessive gas pressure build-up within the coulometer cell 50.

Because of the symmetry of the device, the operation of the coulometer cell 50 is reversible. That is, upon discharge of the battery cell assembly 10 into a load, the passage of current through the coulometer 50 will be in the opposite direction. During the initial discharge period, as indicated between Points E and F, the potential output of the coulometer device will have the same substantially low value as between Points A and B, but in the opposite direction. When the coulometer capacity has been reached, as indicated by the Point F and corresponding to completion of imbalance between the coulometer plates, there will be a severe and abrupt rise of the coulometer output potential towards the Point H, preferably limited at I.

Referring now to FIGS. 2–4, the rechargeable battery assembly 10 is formed of a number of individual cell units 10–1, 10–2 . . . 10–10. The particular number of individual cells similarly connected in the overall rechargeable battery assembly 10 is determined by the intended load application, in the well known manner. The specific cells may be of the sealed nickel cadmium type, generally summarized in aforementioned copending U.S. patent application Ser. No. 373,216, the disclosure of which is herein relied upon to shorten the description of the novel system for charging and discharging such battery cells, as is the subject of the present invention. The invention may, however, be utilized in conjunction with other types of rechargeable alkaline battery cells; for example, in nickel-iron rechargeable cells.

The positive output terminal 12 of battery assembly 10 is shown connected, via common circuit junction 14 to the positive terminal 16 of input charging source 20. Source 20 may typically be a constant current source of a conveniently available magnitude with the term constant current source describing a power source as previously defined herein. The negative terminal 18 of the source is connected to common junction 22 of the transistor 30, collector terminal 34 and one end of base bias resistor 35. The emitter terminal 32 of transistor 30 is connected through common junction 66 (of one end of resistor 56) to terminals 2 of charge-discharge switch S1A. As shown in the charge condition, switch terminal 2 is connected to the common terminal 1, which is in turn connected to one of the terminals 52 of coulometer device 50. The other terminal 54 of the coulometer device is connected to common junction 68 of transistor 40, emitter terminal 42 and negative terminal 13 of the battery. The positive plate of one of the cells, such as 10–1, is in turn connected to the emitter terminal 72 of transistor 70, with the collector terminal 74 thereof being connected to the negative plate of the next battery cell 10–2.

The above-described current path, as shown by the dotted arrows 90, corresponds to the initial charge condition of the battery assembly 10 from energy source 20. That is, transistor 30 will be in its appreciable conducting state, transistor 40 will be cut off and transistor 70 will be acting as a forward biased diode. As should be recognized at this point, inasmuch as the charging current path is serially through coulometer device 50, the coulometer will have an electrical charge input presented thereto by the source 20 which is operatively related to the electrical charge input to battery assembly 10. The switching between the fast charging rate and the substantially slower charging rate, as shown in FIGS. 2 and 3 respectively, is accomplished as follows. FIG. 2 corresponds to the condition where the coulometer has not as yet had its plates completely converted (between the Points A and B of FIG. 1) and the potential across terminals 54, 52 thereof will be at a low value in the order of 0.05 to 0.1. Resistor 56, resistor 58 and diode 60, 62 act as a voltage divider network intermediate junction points 66 and 14. Resistor 58 is of a substantially greater magnitude than resistor 56 and essentially the entire drop across the voltage divider network will be between points 70 and 14. The drop across the resistor 56, however, will be slightly higher than the drop across the coulometer terminals 54, 52. Thus, the potential at point 70 connected to the base 46 of transistor 40 will be at a somewhat higher potential than point 68, which is connected to the emitter 42 of that transistor, thereby back-biasing transistor 40 to its cut-off condition.

When the potential across the coulometer begins to abruptly rise (intermediate Points B and D of FIG. 1), corresponding to its predeterminedly selected input charge capacity, the potential at junction 68 begins to rapidly rise. Since junction 70 is substantially at a constant potential with respect to junction 66, the increased potential across the coulometer 50 will effect a corresponding increase in potential across the emitter-to-base junction (42–46) of transistor 40, thereby turning transistor 40 onto its conducting state. As transistor 40 is turned on and contributes current through resistor 35, the base current of transistor 30 is reduced, thereby turning transistor 30 off, with the charging current path then being as shown by 95 in FIG. 3. Resistor 35 in series within this path is of a sufficient magnitude to limit the charging current through the battery assembly 10 to a safe trickle value, typically one-tenth the charge capacity of the cell. It should, however, be recognized that the characteristics of coulometer 50 are such that a current must be maintained through it, in order for it to maintain its potential, and hence keep the transistor 40 in its conducting state. This current is achieved by the very slight magnitude of leakage current through transistor 30 even when it is in its cut-off condition.

Reference is now made to FIG. 4, which shows another aspect of our invention relating to the utilization of coulometer 50 to prevent against over-discharge of the battery assembly 10 into an external load 100. To connect the circuit into the discharge mode of operation, it is noted that gang switch assembly S1A, S1B is moved to the position, such that contact engagement is maintained between contacts 1–3 thereof. The discharge path shown by dotted arrow 96 is from positive terminal 12 of the battery cell assembly 12, into the load 100, across contacts 3–1 of switch S1A, through coulometer device 50, through cell 10–1 of the cell assembly 10, through the emitter-to-collector junction (72–74) of transistor 70, and remaining cells 10–2, 10–10 of the battery cell assembly 10. As shown in FIG. 4, transistor 70 is in its conducting state, with the base bias supply thereof being obtained by the potential across cell 10–1 and coulometer 50, and limited by base bias resistor 64. Resistor 64 is selected such that the base current bias is sufficient to enable the transistor 70 to appreciably conduct the main discharge current between its emitter-to-collector junction. It should be noted also that the current through the coulometer 50 will be equal to the main discharge current through the load, plus the base bias current 105. This base bias current is typically in the order of 10% of the current through path 96. Hence, the coulometer 50 will be discharged by a current of approximately 110% of load current. Similarly, the current supplied by cell 10–1 is equal to the discharge current plus the transistor 70 bias current where the current supplied by the other cells 10–2—10–10 is equal only to the load current 96. Hence, cell 10–1 will discharge at a faster rate than the other cells.

During the discharge cycle, it should be noted that the polarity of the voltage across the terminals 52, 54 of coulometer 50 will oppose that across the battery cell 10–1 in establishing the base bias current. Under initial conditions of discharge, the potential across cell 10–1 is typically in the order of 1.5 volts, and that across the coulometer is in the order of 0.05 to one-tenth of a volt in the opposite direction (between Points E and F of FIG. 1). Hence, the polarity of cell 10–1 will provide sufficient base bias current to maintain transistor 70 in its conducting state. However, as the battery begins to appreciably discharge to the point that the capacity of coulometer 50 is reached, it begins to undergo a substantial increase in output potential, opposing the potential of cell 10–1 (between Points F and H of FIG. 1), to the point that it sufficiently opposes the potential of cell 10–1, such that the base current 105 will be sufficiently reduced to cut off transistor 70. It should also be recognized that while the potential across coulometer 50 is building up, the potential across cell 10–1 is being reduced. Thus, the protection afforded by the cut-off of transistor 70 is twofold, and results from the combined action of the coulometer providing a sufficient voltage magnitude which is indicative of the battery cell assembly 10 reaching its maximum desired discharged condition, or cell 10–1 being in an excessively discharged condition.

A circuit constructed in accordance with FIGS. 2–4, and having the following component values, has demonstrated successful operation in conjunction with a battery assembly of ten individual nickel cadmium cells. It should, however, be understood that these exemplary parameters are not intended as a limitation on the scope of our invention.

| | |
|---|---|
| Transistors 30, 40 and 70 | 2N554. |
| Resistor 35 | 68 ohms, 2 watts. |
| Resistor 56 | 100 ohms, ½ watt. |
| Resistor 58 | 3.3 K., ½ watt. |
| Resistor 64 | 27 ohms, ½ watt. |
| Diodes 60, 62 | IN276. |

It should be understood that a complementary circuit may be provided using NPN transistor types.

FIG. 5 typically shows the charge-discharge characteristics attainable by the control circuit of FIGS. 2–4, with the coulometer potential being superimposed by the dotted curve. The charging currents from the current source 20 are initially at a high value, as indicated by the portion of the charging current graph designated by the numeral 102. At this time the potential of coulometer device 50 will be at its relatively low substantially constant magnitude indicated by portion 106 of the coulometer voltage characteristic. However, at the line T1 the coulometer will experience an abrupt change of output potential to the magnitude indicated by 108, accompanied by the switching between transistors 30 and 40, such that the charge current will not be at the low rate indicated by curved portion 104. Such charging current may be presented to the battery assembly 10 for a prolonged duration of time, without danger of damage thereto. After some arbitrary time, indicated by T2, switches S1A, S1B are thrown such that the battery assembly 10 will discharge into load 100. The discharge current is initially large and gradually decreases as indicated by the curved portion 110. During this period the potential of coulometer device 50 is at a substantially constant but opposite polarity value, as indicated by its curved portion 112. At the time T3 the coulometer capacity is reached, such that the coulometer potential undergoes an abrupt increase to 116, with the consequent cutting off of transistor 70 such that the discharge current is substantially stopped, as shown by curved portion 114.

It is therefore seen that our invention advantageously utilizes a coulometer device to control either one or both the charge, discharge of a battery cell assembly in accordance with the charge conditions thereof.

In the foregoing, the invention has been described in conjunction with a preferred illustrative embodiment. Since many variations will now become obvious to those skilled in the art, it is accordingly desired that the breadth of the claims not be limited to the specific disclosure herein contained.

The embodiments of the invention in which an exclusive privilege or property is claimed are defined as follows:

1. In a system for recharging a battery with opposite-polarity poles from a source of electrical energy having a pair of opposite polarity input terminals;
    a control circuit connected to said source terminals, including a charge totalizing means circuit connected in the charging path of said battery and source for receiving an electrical charge input from said source operatively related to the quantity of electrical charge input delivered by said source to said battery;
    said charge totalizing means characterized as presenting an electrical signal output when the charge input presented thereto reaches a predetermined quantity, operatively related to a predeterminedly selected charge input to said battery;
    said control circuit including electronic circuit means responsive to said electrical signal output for appreciably reducing the electrical energy input from said source to said control circuit, and the rate of charge input to said battery;
    such that said control circuit and battery will receive an initial charge from said source at a first rate and upon the presentation of said electrical signal output thereafter receive energy from said source at an appreciably reduced second rate, with the switching between said first and second rates being responsive to the charge input to said battery as determined by the charge condition of said charge totalizing means;
    said control circuit including a discharge path for said battery into an external load, said discharge path including said charge totalizer means, circuit connected in a manner such that the current flow therethrough during battery discharge is opposite to the current flow therethrough during battery charge, and said charge totalizer means will have its charged condition vary in accordance with the battery charge condition;
    said charge totalizing means characterized as presenting an opposite polarity electrical signal output, when the charge input thereto in said opposite direction reaches a second predtermined quantity, operatively related to a predeterminedly selected discharged condition of said battery;
    overdischarge protection means responsive to said second electrical signal output for substantially stopping the discharge current flow, such that said battery is protected against discharging beyond said predetermined discharged condition;
    said overdischarge protection means being further responsive to the condition of at least one of the battery cells, for substantially stopping the discharge current flow when said one cell reaches a particular dissipative condition.

2. In a system for recharging a battery as set forth in claim 1:
    said discharge path serving to discharge said one cell at a faster rate than the other cells of said battery, such that said one cell reaches said particular dissipative condition before the other cells reach such condition.

3. In a system for recharging a battery as set forth in claim 1:
    said charge totalizing means being electrochemical coulometer having a pair of output terminals;
    said coulometer characterized as having a low substantially constant potential output between its terminals, corresponding to an electrical charge condition below a predetermined magnitude, and upon reaching said predetermined magnitude in a first or second direction of current flow exhibiting an abrupt increase of output potential, of a first or second polarity corresponding to current flow in said first or second direction respectively, with said abrupt potential change providing said electrical signal output and opposite polarity electrical signal output respectively;
    said over-discharge protection means including a transistor in the discharge path of said battery into an external load, said transistor including an emitter, collector and base terminal;
    the emitter-to-collector junction of said transistor series connected in said discharge path;
    said opposite polarity electrical signal and potential of said one battery cell presenting a combined potential between the emitter-to-base junction for cutting of said transistor and the discharge current responsive to such combined potential.

References Cited

UNITED STATES PATENTS

| | | | | |
|---|---|---|---|---|
| 1,429,948 | 9/1922 | Hulse | 320—40 X |
| 2,051,514 | 8/1936 | Block | 320—40 |
| 3,302,091 | 1/1967 | Henderson. | |
| 3,312,863 | 4/1967 | Muldoon | 317—33 |
| 3,321,690 | 5/1967 | McCarthy et al. | 320—6 |
| 3,293,445 | 12/1966 | Levy | 320—57 X |
| 3,329,882 | 7/1967 | Sobel | 320—39 |

JOHN F. COUCH, *Primary Examiner.*

LEE T. HIX, *Examiner.*

S. WEINBERG, *Assistant Examiner.*

U.S. Cl. X.R.

320—14, 23, 50